(12) United States Patent
Nimura et al.

(10) Patent No.: US 11,433,743 B2
(45) Date of Patent: Sep. 6, 2022

(54) HALF MIRROR

(71) Applicant: FUJIFILM Corporation, Tokyo (JP)

(72) Inventors: Shigeaki Nimura, Kanagawa (JP);
Hiroshi Inada, Kanagawa (JP); Rie Takasago, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 353 days.

(21) Appl. No.: 16/720,001

(22) Filed: Dec. 19, 2019

(65) Prior Publication Data

US 2020/0122555 A1    Apr. 23, 2020

Related U.S. Application Data

(63) Continuation of application No. PCT/JP2018/025086, filed on Jul. 2, 2018.

(30) Foreign Application Priority Data

Jul. 4, 2017    (JP) .............................. JP2017-130937

(51) Int. Cl.
*B60J 1/02*    (2006.01)
*G02B 27/01*    (2006.01)
(Continued)

(52) U.S. Cl.
CPC .................. *B60J 1/02* (2013.01); *G02B 5/30* (2013.01); *G02B 27/0101* (2013.01);
(Continued)

(58) Field of Classification Search
CPC ...... B60J 1/02; B60J 1/00; G02B 5/30; G02B 27/0101; G02B 2027/0118; G02B 5/26;
(Continued)

(56) References Cited

U.S. PATENT DOCUMENTS 5,061,046 A * 10/1991 Lee ........................ C09K 19/38
                                                349/193
2006/0181769 A1* 8/2006 Kumasawa .......... G03B 21/604
                                                359/449
(Continued)

FOREIGN PATENT DOCUMENTS

EP        0351967        1/1990
JP        H04114531      10/1992
(Continued)

OTHER PUBLICATIONS

"International Search Report (Form PCT/ISA/210) of PCT/JP2018/025086," dated Oct. 2, 2018, with English translation thereof, pp. 1-5.
(Continued)

*Primary Examiner* — D Glenn Dayoan
*Assistant Examiner* — Dana D Ivey
(74) *Attorney, Agent, or Firm* — JCIPRNET

(57) ABSTRACT

Provided is a half mirror which is used for a windshield constituting a head up display, and in which a feeling of glare is suppressed, and a boundary between a region which selectively reflects visible light and a region which reflects visible light is made inconspicuous. The half mirror has a reflection layer including a non-reflection region which does not reflect visible light, a reflection region which selectively reflects visible light, and a mixed region which is provided between the regions and in which a non-reflection portion which does not reflect visible light and a reflection portion which selectively reflects visible light are mixed, and in the mixed region, an area of the reflection portion is gradually increased from the non-reflection region toward the reflection region.

18 Claims, 6 Drawing Sheets

(51) Int. Cl.
  *G02B 5/30* (2006.01)
  *B60J 1/00* (2006.01)
  *B60K 35/00* (2006.01)
  *G02B 5/26* (2006.01)
  *B32B 17/10* (2006.01)

(52) U.S. Cl.
  CPC .... *B32B 17/10036* (2013.01); *B32B 17/10504* (2013.01); *B60J 1/00* (2013.01); *B60K 35/00* (2013.01); *G02B 5/26* (2013.01); *G02B 5/3016* (2013.01); *G02B 27/01* (2013.01); *G02B 2027/0118* (2013.01)

(58) Field of Classification Search
  CPC ............... G02B 5/3016; G02B 27/01; B32B 17/10036; B32B 17/10504; B60K 35/00
  USPC ........................................ 296/84.1
  See application file for complete search history.

(56) References Cited

U.S. PATENT DOCUMENTS

| | | | |
|---|---|---|---|
| 2012/0091479 A1* | 4/2012 | Hara | G02F 1/1345 |
| | | | 257/E27.12 |
| 2012/0327318 A1 | 12/2012 | Tamura | |
| 2013/0265646 A1* | 10/2013 | Sakai | G02B 30/52 |
| | | | 359/630 |
| 2017/0343806 A1 | 11/2017 | Anzai et al. | |

FOREIGN PATENT DOCUMENTS

| | | |
|---|---|---|
| JP | 2013072985 | 4/2013 |
| JP | 2015100922 | 6/2015 |
| JP | 2016153281 | 8/2016 |
| WO | 2011111548 | 9/2011 |

OTHER PUBLICATIONS

"International Preliminary Report on Patentability (Form PCT/IPEA/409) of PCT/JP2018/025086," completed on Oct. 8, 2019, with English translation thereof, pp. 1-14.

"Office Action of Japan Counterpart Application", dated May 26, 2020, with English translation thereof, p. 1-p. 8.

"Search Report of Europe Counterpart Application", dated Jun. 8, 2020, pp. 1-7.

"Office Action of Europe Counterpart Application", dated Mar. 1, 2022, p. 1-p. 5.

\* cited by examiner

HALF MIRROR

CROSS-REFERENCE TO RELATED APPLICATIONS

This application is a Continuation of PCT International Application No. PCT/JP2018/025086 filed on Jul. 2, 2018, which claims priority under 35 U.S.C. § 119(a) to Japanese Patent Application No. 2017-130937 filed on Jul. 4, 2017. The above application is hereby expressly incorporated by reference, in its entirety, into the present application.

BACKGROUND OF THE INVENTION

1. Field of the Invention

The present invention relates to a half mirror which is used for a vehicle windshield or the like serving as a screen of a head up display.

2. Description of the Related Art

There has been known a so-called head up display which projects an image on a windshield (front windshield) of a vehicle or the like and provides information to a driver (JP2016-153281A). In the following description, the head up display is also referred to as "HUD". HUD is an abbreviation for "Head up Display".

According to the HUD, a driver can obtain various information such as maps, speed, and a vehicle state without greatly turning his/her eyes while looking at a scene at the front side. Accordingly, it is possible to expect safer driving while obtaining various information.

For example, in the HUD, a half mirror serving as a transparent screen is provided on a windshield of a vehicle, and an image is projected on the half mirror to provide information to a driver while securing a field of view in front of the vehicle.

For example, JP2016-153281A describes, as a windshield (windshield glass) corresponding to a HUD, a windshield having a second glass plate, an interlayer, and a first glass plate in this order, in which the interlayer includes a half mirror film, and the half mirror film includes a cholesteric liquid crystal layer.

SUMMARY OF THE INVENTION

In general, the image display by a HUD is performed on the lower side of a windshield so as not to disturb driving. Accordingly, basically, a half mirror for display may be provided only on the lower side of the windshield.

However, in a case where a half mirror of the HUD is provided only on the lower side of the windshield, a boundary between the half mirror and a part having no half mirror is conspicuous and obtrusive. In some cases, it disturbs driving.

In a case where the half mirror is provided throughout the whole surface of the windshield, the problem that the boundary between the half mirror and the part having no half mirror is conspicuous is solved.

However, in a case where the half mirror is provided throughout the whole surface of the windshield, the light entering the vehicle from the outside, the light reflected by a dashboard, or the like enters the windshield (half mirror) and is reflected, whereby so-called glare in which the light flickers occurs.

An object of the present invention is to solve such problems of the related art, and to provide a half mirror which is used for a windshield serving as a screen in a HUD, and in which no boundary is conspicuous and glare can be suppressed.

The present invention solves the problems by the following configurations.

[1] A half mirror which is used for a windshield, comprising: a reflection layer including a non-reflection region which does not reflect visible light, a reflection region which is formed of a cholesteric liquid crystal layer and selectively reflects visible light, and a mixed region between the non-reflection region and the reflection region, in which a non-reflection portion which does not reflect visible light and a reflection portion which is formed of a cholesteric liquid crystal layer and selectively reflects visible light are mixed, in which in the mixed region, an area of the reflection portion is gradually increased from the non-reflection region toward the reflection region.

[2] The half mirror according to [1], in which the non-reflection region of the reflection layer is formed of a cholesteric liquid crystal layer and reflects ultraviolet rays or infrared rays.

[3] The half mirror according to [1] or [2], in which the reflection layer has no joining surface between the non-reflection region and the mixed region and between the mixed region and the reflection region.

[4] The half mirror according to any one of [1] to [3], in which the reflection layer has at least one of a red light reflection layer in which the reflection region selectively reflects red light, a green light reflection layer in which the reflection region selectively reflects green light, or a blue light reflection layer in which the reflection region selectively reflects blue light.

[5] The half mirror according to [4], in which two of the red light reflection layer, the green light reflection layer, and the blue light reflection layer are provided.

[6] The half mirror according to any one of [1] to [3], in which the reflection region of the reflection layer selectively reflects at least two of red light, green light, and blue light.

[7] The half mirror according to any one of [1] to [6], further comprising: a $\lambda/2$ plate.

According to the present invention, there is provided a half mirror which is used for a windshield serving as a screen in a HUD, and in which no boundary is conspicuous and glare can be suppressed.

DESCRIPTION OF THE PREFERRED EMBODIMENTS

Hereinafter, a half mirror according to an embodiment of the present invention will be described in detail based on preferred examples shown in the accompanying drawings.

In the present invention, a numerical value range expressed using "to" means a range including numerical values before and after "to" as a lower limit value and an upper limit value, respectively.

Unless otherwise specified, an angle or the like includes a generally allowable error range.

In the present invention, "(meth)acrylate" means "one or both of acrylate and methacrylate".

In the present invention, visible light is light with a wavelength visible to the human eye among electromagnetic waves, and refers to light in a wavelength range of 400 to 700 nm. Invisible light is light in a wavelength range of less than 400 nm or a wavelength range of greater than 700 nm.

Although not limited to this, among visible light, light in a wavelength range of 420 to 490 nm is blue (B) light, light in a wavelength range of 495 to 570 nm is green (G) light, and light in a wavelength range of 620 to 700 nm is red (R) light.

In the present invention, ultraviolet rays (ultraviolet light) refer to light in a wavelength range of less than 380 nm and 200 nm or greater, and infrared rays (infrared light) refer to light in a wavelength range of greater than 780 nm and 1 mm or less. A near-infrared region refers to light in a wavelength range of greater than 780 nm and 2,000 nm or less.

Figure 1:
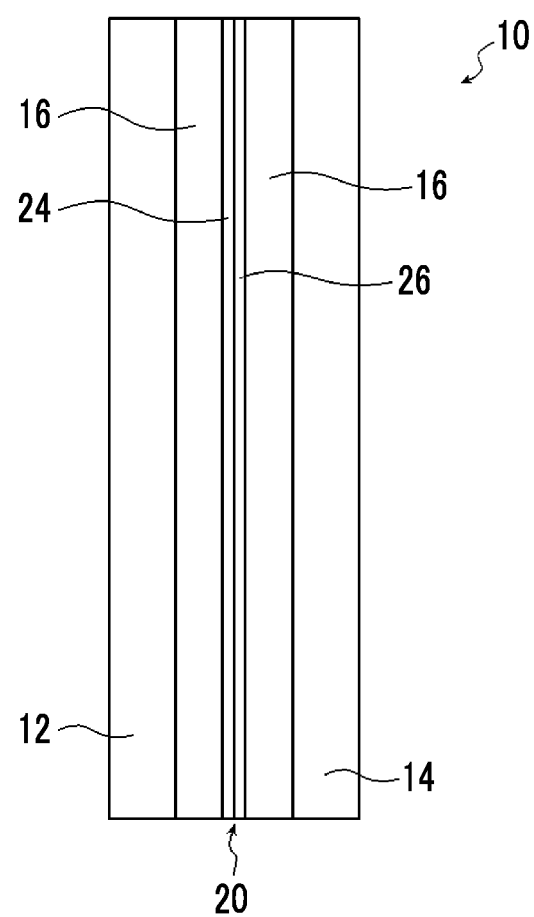
FIG. 1 is a conceptual diagram of an example of a windshield using a half mirror according to an embodiment of the present invention.

FIG. 1 conceptually shows an example of a windshield using the half mirror according to the embodiment of the present invention.

A windshield 10 shown in FIG. 1 is a vehicle windshield, and includes an outer surface side glass 12, an inner surface side glass 14, an intermediate film 16, and a half mirror 20 according to the embodiment of the present invention. The half mirror 20 includes a reflection layer 24 and a λ/2 plate 26.

The windshield 10 using the half mirror 20 according to the embodiment of the present invention is used as a screen (image display surface) on which an image is projected in a HUD.

The half mirror according to the embodiment of the present invention is not particularly limited in its use as long as it is used for a windshield. For example, the half mirror can be used for various known windshields (front windshields, windshields) such as aircraft windshields, motorcycle windshields, and ship windshields, in addition to the vehicle windshield shown in the illustrated example.

The windshield 10 in the illustrated example is a so-called laminated glass, and has a configuration in which the half mirror 20 is sandwiched between two intermediate films 16, and the intermediate films 16 are sandwiched between the outer surface side glass 12 and the inner surface side glass 14.

Both the outer surface side glass 12 and the inner surface side glass 14 are known glasses (glass plates) which are used for vehicle windshields or the like. Accordingly, the forming materials, thicknesses, shapes, and the like thereof may be the same as those of glasses used for known windshields.

Both the outer surface side glass 12 and the inner surface side glass 14 have a flat plate shape in the illustrated example, but may have a curved surface part or have a curved surface shape.

The intermediate film 16 is a known intermediate film (interlayer, adhesion layer) which prevents the glass from penetrating the vehicle in a case where an accident occurs, and is used for a windshield of laminated glass which adheres the half mirror 20, the outer surface side glass 12, and the inner surface side glass 14.

The intermediate film 16 is a known intermediate film which is used for a windshield. Accordingly, the intermediate film 16 may be formed of a known material which is used for an intermediate film of laminated glass, such as polyvinyl butyral (PVB), an ethylene-vinyl acetate copolymer, a chlorine-containing resin, and polyurethane. The thickness of the intermediate film 16 may be set so as to be the same as that of an intermediate film of a known windshield.

In the windshield using the half mirror according to the embodiment of the present invention, instead of the intermediate film 16, an adhesive may be provided to perform at least one of the adhesion between the half mirror 20 and the outer surface side glass 12 or the adhesion between the half mirror 20 and the inner surface side glass 14.

The windshield 10 of the illustrated example has the half mirror 20 such that the half mirror is sandwiched between two intermediate films 16.

The half mirror 20 is a half mirror for a windshield according to the embodiment of the present invention, and has a reflection layer 24 and a λ/2 plate 26. The λ/2 plate 26 is provided as a preferred aspect, and is not an essential constituent requirement in the half mirror according to the embodiment of the present invention.

Figure 2:
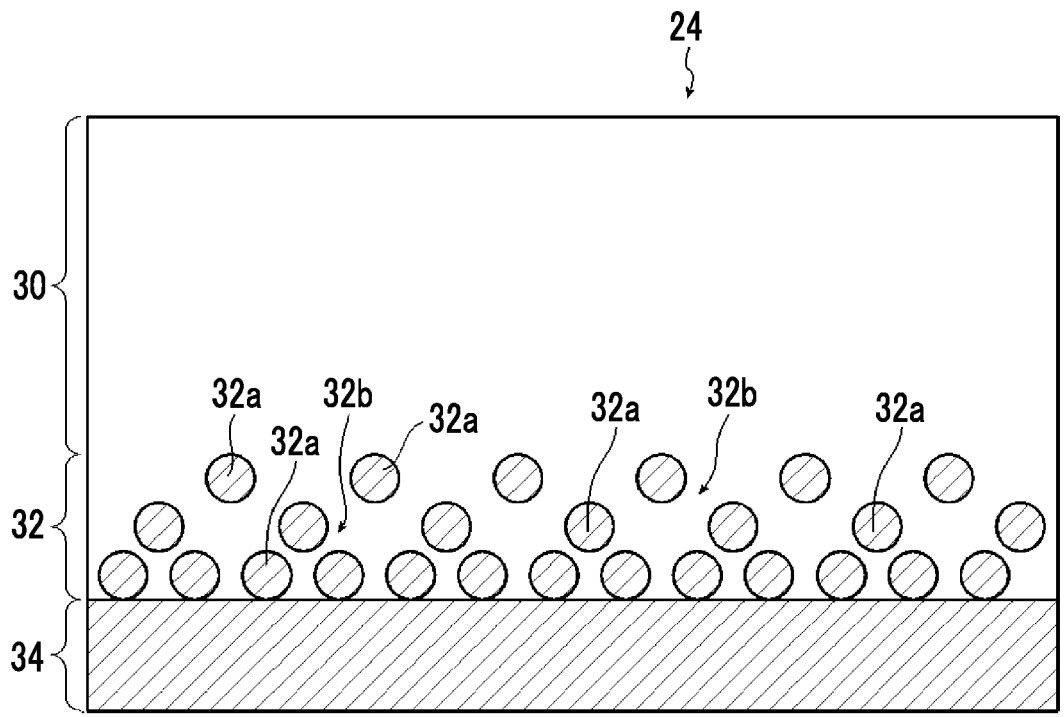
FIG. 2 is a conceptual diagram of an example of a reflection layer of the half mirror according to the embodiment of the present invention.

FIG. 2 conceptually shows a plan view of the reflection layer 24. The plan view of the reflection layer 24 is a view of the reflection layer 24 viewed in the horizontal direction of FIG. 1, that is, a view of the reflection layer viewed in a direction of eyes of a vehicle driver.

In FIG. 2, the upper side is the upper side of the windshield 10, that is, the roof (roof) side. Accordingly, in FIG. 2, the vertical direction is a vertical direction of the vehicle, and the horizontal direction is a vehicle width direction of the vehicle. Hereinafter, the vertical direction of the vehicle is also simply referred to as "vertical direction", and the width direction of the vehicle is also simply referred to as "width direction".

As shown in FIG. 2, the reflection layer 24 has an infrared reflection region 30, a mixed region 32, and a visible light reflection region 34 from above. In the illustrated example, the reflection layer 24 is a cholesteric liquid crystal layer provided by fixing a cholesteric liquid crystalline phase.

The infrared reflection region 30 is a region which selectively reflects infrared rays over the whole surface in a surface direction of the windshield 10. "Selectively reflecting infrared rays" means that infrared rays are reflected and other light rays are transmitted. That is, in the reflection layer 24 in the illustrated example, the infrared reflection region corresponds to a non-reflection region which does not reflect visible light.

In the following description, the surface direction of the windshield 10 is also simply referred to as "surface direction".

The mixed region 32 is a region in which an infrared reflection portion 32b which selectively reflects infrared rays and a visible light reflection portion 32a which selectively reflects visible light are mixed in the surface direction. "Selectively reflecting visible light" means that visible light in a predetermined wavelength region is reflected and other light rays are transmitted. As described above, the infrared reflection portion 32b which selectively reflects infrared rays does not reflect visible light. That is, the infrared reflection portion 32b of the mixed region 32 corresponds to a non-reflection portion in the present invention which does not reflect visible light in the mixed region. In addition, the visible light reflection portion 32a of the mixed region 32 constitutes a reflection portion which selectively reflects visible light in the mixed region 32. In the mixed region 32, a total area of the visible light reflection portion 32a is the area of the reflection portion in the present invention.

The visible light reflection region 34 is a region which selectively reflects visible light over the whole surface in the surface direction. The visible light reflection region 34 is a reflection region in the present invention. In a HUD using the windshield 10, an image is displayed (projected) in the visible light reflection region 34.

In FIG. 2, the reflection region and the reflection portion which selectively reflect visible light are indicated by shading, and the region and the reflection portion which selectively reflects infrared rays are indicated in white.

In the present invention, the visible light reflection region (reflection region) of the reflection layer may be provided such that the area of a part which selectively reflects visible light is 50% or greater of the total area of the visible light reflection region. That is, a part which does not reflect visible light, such as a part which selectively reflects infrared rays, may exist at an area ratio of less than 50% in the visible light reflection region of the reflection layer.

In a case where the visible light reflection region has a part which does not reflect visible light, the area ratio between the part which selectively reflects visible light and the part which selectively reflects light other than visible light is preferably uniform throughout the whole region in the surface direction. In a case where the visible light reflection region has a part which does not reflect visible light, the part which does not reflect visible light is preferably uniformly dispersed in the surface direction.

The same applies to the infrared reflection region 30 (non-reflection region).

In the reflection layer 24 shown in FIG. 2, the visible light reflection region 34 and the visible light reflection portion 32a of the mixed region 32, that is, the region which selectively reflects visible light selectively reflects, for example, green light.

That is, a HUD using the reflection layer 24 displays a green monochrome image in the windshield 10.

As described above, the reflection layer 24 is a cholesteric liquid crystal layer provided by fixing a cholesteric liquid crystalline phase. That is, the reflection layer 24 (cholesteric liquid crystal layer) has a cholesteric liquid crystal structure.

As is well known, the cholesteric liquid crystalline phase has wavelength-selective reflecting properties in which selective reflecting properties are exhibited at a specific wavelength.

As described above, the reflection layer 24 has, from above, the infrared reflection region 30 which selectively reflects infrared rays over the whole surface, the mixed region 32 in which the infrared reflection portion 32b which selectively reflects infrared rays and the visible light reflection portion 32a which selectively reflects green light are mixed, and the visible light reflection region 34 which selectively reflects green light over the whole surface.

Here, in the mixed region 32, a total area of the visible light reflection portion 32a which selectively reflects green light, that is, the area of the reflection portion in the mixed region of the present invention is gradually increased, and the area of the infrared reflection portion 32b (non-reflection portion in the present invention) which selectively reflects infrared rays is gradually decreased from the infrared reflection region 30 toward the visible light reflection region 34, that is, from above toward below. In the illustrated example, in the mixed region 32, a plurality of circular visible light reflection portions 32a having the same size are arranged and constitute the reflection portion. In the mixed region 32 of the illustrated example, the number of visible light reflection portions 32a in the width direction, that is, the total area of the visible light reflection portions 32a in the width direction is gradually increased from above toward below. In the following description, the total area of the visible light reflection portions 32a is also simply referred to as "area of visible light reflection portions 32a" for the sake of convenience.

The half mirror 20 according to the embodiment of the present invention has such a reflection layer 24 having the infrared reflection region 30 and the mixed region 32, and thus no boundary is conspicuous and glare can be suppressed in a windshield serving as a screen in a HUD.

As shown in the above-described JP2016-153281A, a half mirror is used to display (project) an image on a windshield in a HUD. The half mirror for displaying an image may be provided only in an image projection region in the windshield. The image projection region in the windshield is usually on the lower side of the windshield.

However, in a case where the half mirror is provided only in the image projection region in the windshield, a boundary between the half mirror and a region having no half mirror becomes conspicuous and obtrusive.

In a case where the half mirror is provided throughout the whole surface of the windshield, the problem that the boundary between the half mirror and the region having no half mirror is conspicuous is solved. However, in a case where the half mirror is provided throughout the whole surface of the windshield, the light entering the vehicle from the outside, the light reflected by a dashboard, or the like enters the windshield (half mirror) and is reflected, whereby so-called glare occurs.

In contrast, the half mirror 20 according to the embodiment of the present invention has the visible light reflection region 34 which selectively reflects visible light to display an image by a HUD, the infrared reflection region 30 which selectively reflects infrared rays, and the mixed region 32 between the visible light reflection region 34 and the infrared reflection region 30, in which the infrared reflection portion 32b which selectively reflects infrared rays and the visible light reflection portion 32a which selectively reflects visible light are mixed, and the area of the visible light reflection portion 32a which reflects visible light is gradually increased toward the lower side of the windshield.

In the infrared reflection region 30 which selectively reflects infrared rays, visible light is transmitted, and thus glare caused by reflection of visible light by the half mirror 20 can be significantly suppressed. In addition, since the mixed region 32 in which the area of the visible light reflection portion 32a which reflects visible light is gradually increased toward the lower side of the windshield is provided between the infrared reflection region 30 and the visible light reflection region 34 serving as a screen, the boundary between the infrared reflection region 30 and the visible light reflection region 34 is not conspicuous.

In the mixed region 32 of the illustrated example, the number of circular visible light reflection portions 32a in the width direction is gradually increased from the upper side to the lower side of the windshield 10, and thus the area (total area) of the visible light reflection portions 32a which reflect visible light is gradually increased from the upper side to the lower side of the windshield 10.

Figure 11:
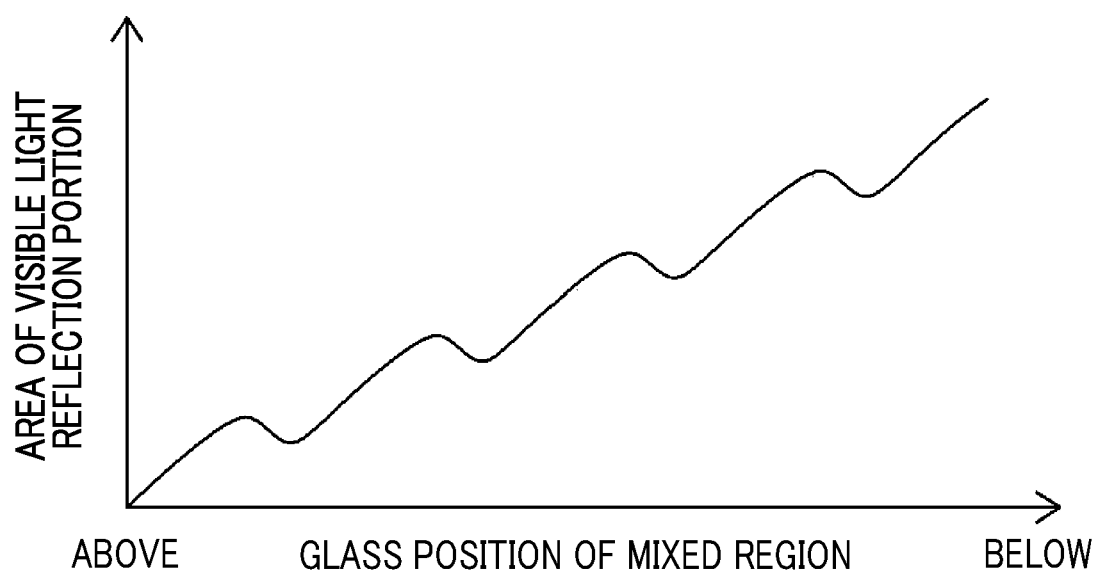
FIG. 11 is a graph for explaining a configuration of the present invention.

Accordingly, as conceptually shown in FIG. 11, from a position above the center in the vertical direction of the circular visible light reflection portions 32a to the lower side, there is also a region in which the area of the visible light reflection portions 32a which reflect visible light is decreased from the upper side to the lower side of the windshield 10 in actuality.

However, in the present invention, even in a case where the mixed region 32 includes a region in which the area of the visible light reflection portions 32a which reflect visible light is decreased, the area of the reflection portion which selectively reflects visible light (total area of the visible light reflection portions 32a in the illustrated example) is assumed to gradually increase in the mixed region 32 in a case where the area is gradually increased as a whole from the upper side to the lower side of the windshield 10 as shown in FIG. 11.

The reflection layer 24 is a cholesteric liquid crystal layer provided by fixing a cholesteric liquid crystalline phase.

A center wavelength $\lambda$ of selective reflection (selective reflection center wavelength $\lambda$) of the cholesteric liquid crystalline phase depends on a pitch P (=period of helix) of a helical structure in the cholesteric liquid crystalline phase, and has a relationship of $\lambda=n\times P$ with an average refractive index n of the cholesteric liquid crystalline phase. Accordingly, the selective reflection center wavelength can be adjusted by adjusting the pitch of the helical structure. Since the pitch of the cholesteric liquid crystalline phase depends on the type of a chiral agent used together with a polymerizable liquid crystal compound or a concentration of the chiral agent, a desired pitch can be obtained by adjusting the type or the concentration of the chiral agent.

A half-width $\Delta\lambda$ (nm) of a selective reflection band (circularly polarized light reflection band) exhibiting selective reflection depends on refractive index anisotropy $\Delta n$ of the cholesteric liquid crystalline phase and the pitch P of the helix, and has a relationship of $\Delta\lambda=\Delta n\times P$. Accordingly, the width of the selective reflection band can be controlled by adjusting the refractive index anisotropy $\Delta n$ of the cholesteric liquid crystalline phase. The refractive index anisotropy $\Delta n$ can be adjusted by the type and the mixing ratio of a liquid crystal compound which forms the reflection layer 24 and the temperature at which the alignment is fixed.

As a method of measuring the sense or the pitch of the helix, the methods described in "Introduction to Liquid Crystal Chemical Experiment" edited by The Japanese Liquid Crystal Society, published by Sigma Publishing (2007), p. 46 and "Liquid Crystal Handbook", edited by Liquid Crystal Handbook Editing Committee, Maruzen-Yushodo Company, Ltd., p. 196 can be used.

Reflected light of the cholesteric liquid crystalline phase is circularly polarized light. Whether the reflected light is right circularly polarized light or left circularly polarized light depends on the twisted direction of the helix of the cholesteric liquid crystalline phase. In the selective reflection of circularly polarized light caused by the cholesteric liquid crystalline phase, right circularly polarized light is reflected in a case where the twisted direction of the helix of the cholesteric liquid crystalline phase is a rightward direction, and left circularly polarized light is reflected in a case where the twisted direction of the helix is a leftward direction.

The reflection layer 24 may be a cholesteric liquid crystal layer which reflects right circularly polarized light, or a cholesteric liquid crystal layer which reflects left circularly polarized light. Alternatively, the reflection layer 24 may be a laminate of a cholesteric liquid crystal layer which reflects right circularly polarized light and a cholesteric liquid crystal layer which reflects left circularly polarized light.

The direction of revolution of the cholesteric liquid crystalline phase can be adjusted by the type of a liquid crystal compound which forms the reflection layer 24 and/or the type of a chiral agent to be added.

The reflection layer 24 may have a single layer or a multilayer structure.

The wavelength range of light to be reflected, that is, the wavelength range of light to be blocked can be widened by sequentially laminating layers in which selective reflection center wavelengths K are shifted. Also known is a technology of widening the wavelength range by a method of changing the helical pitch in the layer in a stepwise manner, called a pitch gradient method, and specific examples thereof include the methods described in Nature 378, 467 to 469 (1995), JP1994-281814A (JP-H06-281814A), and JP4990426B.

As described above, the reflection layer 24 is a cholesteric liquid crystal layer provided by fixing a cholesteric liquid crystalline phase.

The structure in which the cholesteric liquid crystalline phase is fixed may be a structure in which the alignment of a liquid crystal compound which forms a cholesteric liquid crystalline phase is maintained, and typically, a structure in which a polymerizable liquid crystal compound is brought into an alignment state of a cholesteric liquid crystalline phase, and then polymerized and cured by ultraviolet irradiation, heating, or the like, and a layer having no fluidity is formed and simultaneously changed into a state in which no change is caused in the alignment state by an external field or an external force.

In the structure in which the cholesteric liquid crystalline phase is fixed, it is enough, as long as the optical properties of the cholesteric liquid crystalline phase are maintained, and the liquid crystal compound may not exhibit liquid crystal properties. For example, the polymerizable liquid crystal compound may lose liquid crystal properties due to an increase in the molecular weight due to a curing reaction.

Examples of the material used for forming the cholesteric liquid crystal layer in which the cholesteric liquid crystalline phase is fixed include a liquid crystal composition containing a liquid crystal compound. The liquid crystal compound is preferably a polymerizable liquid crystal compound.

The liquid crystal composition containing a liquid crystal compound used for forming the cholesteric liquid crystal layer preferably further contains a surfactant. The liquid crystal composition used for forming the cholesteric liquid crystal layer may further contain a chiral agent, a polymerization initiator, an alignment agent, or the like.

Particularly, the liquid crystal composition which forms the reflection layer 24 which reflects right circularly polarized light is preferably a polymerizable cholesteric liquid crystal composition containing a polymerizable liquid crystal compound, a chiral agent which induces right-handed twist, and a polymerization initiator. The liquid crystal composition which forms the reflection layer 24 which reflects left circularly polarized light is preferably a polymerizable cholesteric liquid crystal composition containing a polymerizable liquid crystal compound, a chiral agent which induces left-handed twist, and a polymerization initiator.

——Polymerizable Liquid Crystal Compound——

The polymerizable liquid crystal compound may be a rod-like liquid crystal compound or a disk-like liquid crystal compound, and is preferably a rod-like liquid crystal compound.

Examples of the rod-like polymerizable liquid crystal compound which forms a cholesteric liquid crystalline phase include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexyl benzonitriles are preferably used. It is possible to use not only a low-molecular-weight liquid crystal compound, but also a polymer liquid crystal compound.

The polymerizable liquid crystal compound is obtained by introducing a polymerizable group in a liquid crystal compound. Examples of the polymerizable group include an unsaturated polymerizable group, an epoxy group, and an aziridinyl group. An unsaturated polymerizable group is preferable, and an ethylenically unsaturated polymerizable group is more preferable. The polymerizable group can be introduced in molecules of a liquid crystal compound by various methods. The number of the polymerizable groups in the polymerizable liquid crystal compound is preferably 1 to 6, and more preferably 1 to 3. Examples of the polymerizable liquid crystal compound include those described in Makromol. Chem., vol. 190, page 2255 (1989), Advanced Materials, vol. 5, page 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more types of polymerizable liquid crystal compounds may be used in combination. Using two or more types of polymerizable liquid crystal compounds in combination may contribute to lowering the alignment temperature.

The amount of the polymerizable liquid crystal compound added in the liquid crystal composition is preferably 75 to 99.9 mass %, more preferably 80 to 99 mass %, and even more preferably 85 to 90 mass % with respect to the solid content mass of the liquid crystal composition (mass excluding the mass of the solvent).

——Chiral Agent (Optically Active Compound)——

The chiral agent functions to induce the helical structure of the cholesteric liquid crystalline phase. The chiral agent may be selected in accordance with the purpose since the helix pitch or the twisted direction of the helix to be induced compounds varies according to the compounds.

That is, a chiral agent which induces right-handed twist may be used in the formation of a reflection layer 24 which reflects right circularly polarized light, and a chiral agent which induces left-handed twist may be used in the formation of a reflection layer 24 which reflects left circularly polarized light.

The chiral agent is not particularly limited, and a known compound (for example, Liquid Crystal Device Handbook, Chapter 3, Section 4-3, Chiral Agent for Twisted Nematic (TN) or Super Twisted Nematic (STN), page 199, edited by No. 142 Committee of Japan Society for the Promotion of Science, in 1989), isosorbide, or an isomannide derivative can be used.

In general, the chiral agent contains asymmetric carbon atoms. However, an axial asymmetric compound or a planar asymmetric compound containing no asymmetric carbon atoms can also be used as a chiral agent. Examples of the axial asymmetric compound or the planar asymmetric compound include binaphthyl, helicene, paracyclophane, and derivatives thereof. The chiral agent may have a polymerizable group. In a case where all of the chiral agent and the liquid crystal compound have a polymerizable group, the polymerization reaction of the polymerizable chiral agent and the polymerizable liquid crystal compound can give a polymer having a repeating unit derived from the polymerizable liquid crystal compound and a repeating unit derived from the chiral agent. In this aspect, the polymerizable group of the polymerizable chiral agent is preferably the same type as the polymerizable group of the polymerizable liquid crystal compound. Accordingly, the polymerizable group of the chiral agent is also preferably an unsaturated polymerizable group, an epoxy group, or an aziridinyl group, more preferably an unsaturated polymerizable group, and particularly preferably an ethylenically unsaturated polymerizable group.

The chiral agent may be a liquid crystal compound.

The chiral agent preferably has a photoisomerizing group since it is possible to form a pattern of a desired reflection wavelength corresponding to an emission wavelength by irradiation with active rays or the like using a photomask after coating and alignment. As the photoisomerizing group, an isomerized moiety of a compound exhibiting photochromic properties, an azo group, an azoxy group, or a cinnamoyl group is preferable. As specific compounds, the compounds described in JP2000-147236A, JP2002-080478A, JP2002-080851A, JP2002-179633A, JP2002-179668A, JP2002-179669A, JP2002-179670A, JP2002-179681A, JP2002-179682A, JP2002-302487A, JP2002-338575A, JP2002-338668A, JP2003-306490A, JP2003-306491A, JP2003-313187A, JP2003-313188A, JP2003-313189A, JP2003-313292A, and the like can be used.

The content of the chiral agent in the liquid crystal composition is preferably 0.01 to 200 mol %, and more preferably 1 to 30 mol % of the amount of the polymerizable liquid crystal compound.

——Polymerization Initiator——

In a case where the liquid crystal composition contains a polymerizable compound, the liquid crystal composition preferably contains a polymerization initiator. In an aspect in which a polymerization reaction is carried out by ultraviolet irradiation, a polymerization initiator to be used is preferably a photopolymerization initiator capable of initiating the polymerization reaction by ultraviolet irradiation. Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combination of triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), and oxadiazole compounds (described in U.S. Pat. No. 4,212,970A).

The content of the photopolymerization initiator in the liquid crystal composition is preferably 0.1 to 20 mass %, and more preferably 0.5 to 12 mass % with respect to the content of the polymerizable liquid crystal compound.

——Crosslinking Agent——

The liquid crystal composition may optionally contain a crosslinking agent in order to improve the film hardness after curing and durability. As the crosslinking agent, a material which is curable with ultraviolet rays, heat, moisture, or the like can be suitably used.

The crosslinking agent is not particularly limited, and can be appropriately selected in accordance with the purpose. Examples thereof include polyfunctional acrylate compounds such as trimethylolpropane tri(meth)acrylate and pentaerythritol tri(meth)acrylate; epoxy compounds such as glycidyl(meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group in a side chain; and alkoxysilane compounds such as vinyltrimethoxysilane and N-(2-aminoethyl)3-aminopropyltrimethoxysilane. A known catalyst can be used depending on the reactivity of the crosslinking agent in order to enhance productivity in addition to the enhancement of the film hardness and the durability. These may be used alone or in combination of two or more types thereof.

The content of the crosslinking agent is preferably 3 to 20 mass %, and more preferably 5 to 15 mass % with respect to the solid content mass of the liquid crystal composition. In a case where the content of the crosslinking agent is within the above range, the crosslinking density improving effect is easily obtained, and stability of the cholesteric liquid crystalline phase is improved.

——Polymerization Inhibitor——

The liquid crystal composition may contain a polymerization inhibitor in order to improve preservability.

Examples of the polymerization inhibitor include hydroquinone, hydroquinone monomethyl ether, phenothiazine, benzoquinone, hindered amine (HALS), and derivatives thereof. These may be used alone or in combination of two or more types thereof.

The content of the polymerization inhibitor is preferably 0 to 10 mass %, and more preferably 0 to 5 mass % with respect to the solid content mass of the liquid crystal composition.

The liquid crystal composition is preferably used as a liquid in the formation of a cholesteric liquid crystal layer.

The liquid crystal composition may contain a solvent. The solvent is not particularly limited, and can be appropriately selected in accordance with the purpose. An organic solvent is preferably used.

The organic solvent is not particularly limited, and can be appropriately selected in accordance with the purpose. Examples thereof include ketones such as methyl ethyl ketone, methyl isobutyl ketone, cyclohexanone, and cyclopentanone, alkyl halides, amides, sulfoxides, heterocyclic compounds, hydrocarbons, esters, and ethers. These may be used alone or in combination of two or more types thereof. Among these, ketones are preferable in consideration of environmental load. The above-described components such as the above-described monofunctional polymerizable monomer may function as a solvent.

Here, as the chiral agent, a chiral agent having a moiety (photoisomerizing group) which is isomerized by light, such as a cinnamoyl group, can be used as described above. In a case where a chiral agent having a photoisomerizing group is used as the chiral agent of the liquid crystal composition, the liquid crystal composition may be applied and heated, and then subjected to patterning and irradiation with weak ultraviolet rays using a mask or the like once or more to isomerize the photoisomerizing group, and thereafter, ultraviolet irradiation for fixing the cholesteric liquid crystalline phase may be performed.

Alternatively, after partial curing by patterning and irradiation with strong ultraviolet rays for fixing the cholesteric liquid crystalline phase using a mask or the like, an unexposed portion or the whole surface may be irradiated with weak ultraviolet rays to isomerize the photoisomerizing group, and thereafter, ultraviolet irradiation for fixing the cholesteric liquid crystalline phase may be performed.

Accordingly, the reflection layer 24 having the visible light reflection region 34, the mixed region 32, and the infrared reflection region 30 can be formed in one continuous layer. This will be described in detail later.

It is also possible to adjust a reflection wavelength range by adjusting the temperature during the ultraviolet irradiation. By performing patterning and irradiation with ultraviolet rays while adjusting the temperature, the reflection layer 24 can be configured to have a plurality of reflection regions which reflect different wavelength ranges of light in the plane. Particularly, by performing the ultraviolet irradiation in a state in which the liquid crystal composition is heated to an isotropic phase temperature thereof or higher, a transmission region having no reflection characteristics in any wavelength range can be formed in the plane.

As described above, the reflection layer 24 has, from above, the infrared reflection region 30 which selectively reflects infrared rays over the whole surface, the mixed region 32 in which the infrared reflection portion 32b which reflects infrared rays and the visible light reflection portions 32a which selectively reflect green light are mixed, and the visible light reflection region 34 which selectively reflects green light over the whole surface.

The length in the vertical direction of the visible light reflection region 34 is not limited in the reflection layer 24. That is, depending on an image display region set in a HUD, the length in the vertical direction of the visible light reflection region 34 may be appropriately set to include the image display region.

In addition, the length in the vertical direction of the mixed region 32, that is, the distance between the infrared reflection region 30 and the visible light reflection region 34 is not limited. That is, depending on a size or the like in the vertical direction of the windshield 10, the length in the vertical direction of the mixed region 32 may be appropriately set such that the boundary between the visible light reflection region 34 and the infrared reflection region 30 is not conspicuous. Specifically, the length in the vertical direction of the mixed region 32 is preferably 10 to 200 mm, and more preferably 50 to 100 mm.

The degree of gradual increase of the visible light reflection portions 32a in the mixed region 32 is also not limited, and may be appropriately selected such that the boundary between the infrared reflection region 30 and the visible light reflection region 34 is not conspicuous in the length in the vertical direction of the mixed region 32. The gradual increase of the visible light reflection portions 32a in the mixed region 32 may be a linear increase or a non-linear increase.

For example, in the mixed region 32, it is preferable that the area (the number in the width direction) of the visible light reflection portions 32a in the width direction is gradually increased from the infrared reflection region 30 toward the visible light reflection region 34 such that there is no visible light reflection portion 32a at a lower end of the infrared reflection region 30, and the whole surface in the width direction at an upper end of the visible light reflection region 34 is constituted by the visible light reflection portions 32a. As described above, in a case where the visible light reflection region has a part which does not selectively reflect visible light, the area of the whole surface is replaced at the area of the visible light reflection portions in the visible light reflection region.

For example, the reflection layer 24 having the infrared reflection region 30, the mixed region 32, and the visible light reflection region 34 can be formed using the above-described liquid crystal composition containing a chiral agent (photosensitive chiral agent) having a photoisomerizing group.

First, a liquid crystal composition containing a photosensitive chiral agent which induces twist corresponding to a target circular polarization direction, a polymerizable liquid crystal compound, a polymerization initiator, an aligning agent, and the like is prepared.

Next, the prepared liquid crystal composition is applied to a forming surface of the reflection layer 24. In the illustrated example, the prepared liquid crystal composition is applied to the λ/2 plate 26. The liquid crystal composition may be applied by a known method such as wire bar application.

Here, for example, the liquid crystal composition is prepared so as to form a cholesteric liquid crystal layer which selectively reflects green light, that is, a cholesteric liquid crystal layer having a selective reflection center wavelength in a wavelength range of green light.

In addition, as the photosensitive chiral agent, for example, a photosensitive chiral agent prepared such that in a case where ultraviolet irradiation is performed thereon, the pitch of the helical structure of a cholesteric liquid crystalline phase to be induced is increased according to the irradiation dose is used. That is, in a case where the liquid crystal composition is irradiated with ultraviolet rays, the selective reflection wavelength of a cholesteric liquid crystal layer to be formed is increased (the selective reflection center wavelength is increased) according to the irradiation dose.

Next, the applied liquid crystal composition is irradiated with ultraviolet rays via a mask having black light shielding portions formed by, for example, a black ink and corresponding to the infrared reflection region 30, the mixed region 32, and the visible light reflection region 34.

Specifically, corresponding to the reflection layer 24 shown in FIG. 2, the liquid crystal composition is irradiated with ultraviolet rays using a mask which shields ultraviolet rays at parts corresponding to the visible light reflection region 34 and the visible light reflection portions 32a of the mixed region 32 and transmits ultraviolet rays at other parts. That is, corresponding to the reflection layer 24 shown in FIG. 2, the liquid crystal composition is irradiated with ultraviolet rays using a mask having a mask pattern in which ultraviolet rays are shielded at positions corresponding to the shaded parts of the reflection layer 24 and pass through other regions.

As described above, the liquid crystal composition forms a cholesteric liquid crystal layer which selectively reflects green light. In a case where the liquid crystal composition (photosensitive chiral agent) is irradiated with ultraviolet rays, the selective reflection wavelength of a cholesteric liquid crystal layer to be formed is increased according to the irradiation dose.

Accordingly, by applying ultraviolet rays of such a dose that a cholesteric liquid crystal layer which reflects infrared rays is formed with respect to the selective reflection wavelength of the cholesteric liquid crystal layer to be formed by the liquid crystal composition, the liquid crystal composition forms a cholesteric liquid crystal layer which selectively reflects infrared rays at a region irradiated with the ultraviolet rays, and forms a cholesteric liquid crystal layer which selectively reflects green light at a region shielded by the light shielding portion of the mask.

Therefore, the reflection layer 24 formed of the liquid crystal composition irradiated with ultraviolet rays can be formed as a reflection layer 24 having an infrared reflection region 30, a mixed region 32, and a visible light reflection region 34 as shown in FIG. 2.

Next, the liquid crystal composition is brought into a state of a cholesteric liquid crystalline phase by being heated, and is cured, and thus the reflection layer 24 is formed.

Alternatively, the liquid crystal composition is brought into a state of a cholesteric liquid crystalline phase by being heated, and is optionally cured by being irradiated with ultraviolet rays, and thus the reflection layer 24 is formed.

The thickness of the reflection layer 24 is not limited, and may be appropriately set according to the wavelength of visible light to be selectively reflected and the reflectivity of target visible light.

In the reflection layer 24 thus formed, the infrared reflection region 30, the mixed region 32, and the visible light reflection region 34 are formed by performing ultraviolet irradiation on the coating film of the liquid crystal composition applied uniformly.

That is, the reflection layer 24 is a single film which has three regions having different light reflection characteristics, and has no joining surface between the infrared reflection region 30 and the mixed region 32 and between the mixed region 32 and the visible light reflection region 34. In other words, the reflection layer 24 is a single film which has three optically different regions and has no physical interface at a boundary between the regions.

In the above example, the reflection layer 24 is formed using a liquid crystal composition (photosensitive chiral agent) prepared such that in a case where ultraviolet irradiation is performed thereon, the selective reflection wavelength of a cholesteric liquid crystal layer to be formed is increased according to the irradiation dose. However, the reflection layer 24 can also be formed by the reverse method.

In this case, a photosensitive chiral agent prepared such that in a case where ultraviolet irradiation is performed thereon, the pitch of a helical structure to be excited is shortened is used. A liquid crystal composition which contains the chiral agent, is prepared such that the selective reflection wavelength of a cholesteric liquid crystal layer to be formed is shortened according to the ultraviolet irradiation dose, and forms a cholesteric liquid crystal layer which selectively reflects infrared rays is prepared. The liquid crystal composition is applied to a forming surface of the reflection layer to form a coating film.

Contrary to the above-described example, using a mask which shields ultraviolet rays at the infrared reflection region 30 and the infrared reflection portion 32b in the mixed region 32 and transmits ultraviolet rays at other regions, the liquid crystal composition is irradiated with ultraviolet rays. Thus, the part irradiated with ultraviolet rays may form a cholesteric liquid crystal layer which selectively reflects visible light by shortening the selective reflection wavelength, and the part which has not been irradiated with ultraviolet rays may form a cholesteric liquid crystal layer which selectively reflects infrared rays to form a similar reflection layer 24 having an infrared reflection region 30, a mixed region 32, and a visible light reflection region 34.

The half mirror 20 in the illustrated example is formed of such a reflection layer 24 and a λ/2 plate 26 as a preferred aspect. The λ/2 plate 26 is disposed closer to the inner surface side glass 14 than the reflection layer 24, that is, on the incidence side of projection light.

In a HUD using the windshield 10, regarding the projection light from a projector, it is preferable that a P-wave (P-polarized light) enters the inner surface side glass 14 at a Brewster angle, and the inner surface side glass 14 and the outer surface side glass 12 do not reflect the projection light. Meanwhile, as described above, the reflection layer 24 is a cholesteric layer which reflects circularly polarized light.

In this case, in a case where the λ/2 plate 26 is viewed from the front (normal direction), it acts as a λ/2 plate, and in a case the λ/2 plate is viewed from the incident direction (Brewster angle) of the projection light, it acts as a λ/4 plate which converts linearly polarized light into circularly polarized light.

Accordingly, in a case where the λ/2 plate 26 is provided, the projection light can be efficiently reflected by the reflection layer 24 by converting the P-wave into the circularly polarized light, and thus an image can be displayed.

As the λ/2 plate 26, various known λ/2 plates (½-wavelength plates), that is, A-plates having a front retardation (Re) of a λ/2 plate can be used.

In the mixed region 32 of the reflection layer 24 shown in FIG. 2, the area of the regions which reflect visible light is gradually increased from the infrared reflection region 30 toward the visible light reflection region 34 by changing the number of the regions which selectively reflect visible light of the same intensity. However, the present invention can use various configurations other than the above configuration.

Figure 3:
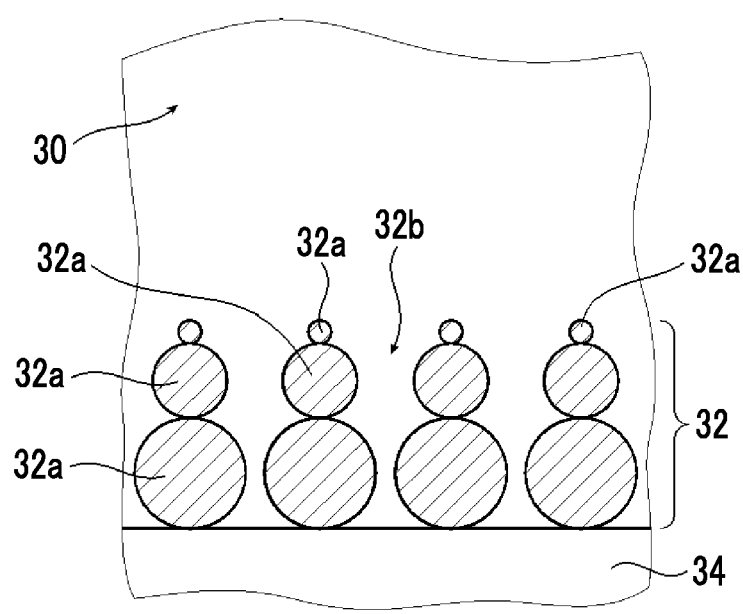
FIG. 3 is a conceptual diagram of another example of the reflection layer of the half mirror according to the embodiment of the present invention.

For example, as conceptually shown in FIG. 3, a mixed region 32 in which the area of the regions which reflect visible light is gradually increased from an infrared reflection region 30 toward a visible light reflection region 34 may be provided by uniformizing the number of the regions which are provided in a width direction and selectively reflect visible light, and by gradually increasing the area of the regions which selectively reflect visible light from the infrared reflection region 30 toward the visible light reflection region 34.

The reflection layer 24 (half mirror 20) shown in FIG. 2 has the infrared reflection region 30 which selectively reflects infrared rays as a non-reflection region which does not reflect visible light as a preferred aspect from the viewpoint of advantages such as prevention of a temperature increase in a vehicle, but the present invention is not limited thereto.

For example, a reflection layer having an ultraviolet reflection region which selectively reflects ultraviolet rays can also be used as a non-reflection region which does not reflect visible light. This configuration is preferred in that it is possible to reduce ultraviolet rays entering the vehicle from the outside.

Alternatively, the non-reflection region which does not reflect visible light may be a region (non-reflective region) which reflects neither visible light nor infrared or ultraviolet rays. The non-reflection region can be formed in a cholesteric liquid crystal layer to be a reflection layer by, for example, making the helical pitch of the cholesteric liquid crystalline phase in the non-reflection region larger than the thickness of the reflection layer (cholesteric liquid crystal layer).

For example, the half mirror 20 shown in FIG. 1 corresponds to a HUD which performs green monochrome display in which the visible light reflection region 34 as a reflection region of the reflection layer 24 selectively reflects green light, but the present invention is not limited thereto.

That is, the half mirror according to the embodiment of the present invention may correspond to an HUD which performs red monochrome display in which the visible light reflection region of the reflection layer selectively reflects red light. Alternatively, the half mirror according to the embodiment of the present invention may correspond to a HUD which performs blue monochrome display in which the visible light reflection region of the reflection layer selectively reflects blue light.

In the above examples as well, the selectively reflected light of the reflection portion which selectively reflects visible light in the mixed region is light of the same color as the visible light reflection region.

Figure 4:
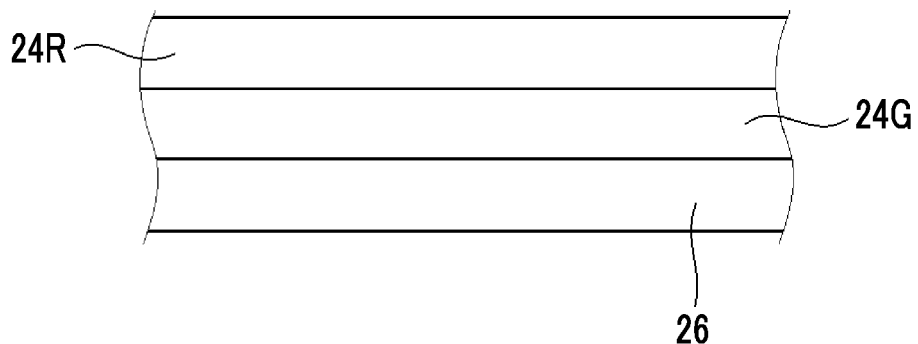
FIG. 4 is a conceptual diagram of still another example of the reflection layer of the half mirror according to the embodiment of the present invention.

As conceptually shown in FIG. 4, the half mirror according to the embodiment of the present invention may be a half mirror which has, as reflection layers, a green light reflection layer 24G in which the visible light reflection region selectively reflects green light and a red light reflection layer 24R in which the visible light reflection region selectively reflects red light, and corresponds to a HUD which has a laminate of the green light reflection layer 24G and the red light reflection layer 24R and displays a full color image. In this half mirror, the display of a full color image can be ensured by making the selective reflection center wavelength of the cholesteric layer in the visible light reflection region closer to the wavelength range of blue light in the green light reflection layer, and by widening the selective reflection band (half-width).

Furthermore, the half mirror according to the embodiment of the present invention may be a half mirror which has, as reflection layers, a red light reflection layer in which the visible light reflection region selectively reflects red light and a blue light reflection layer in which the visible light reflection region selectively reflects blue light, and corresponds to a HUD which has a laminate of the red light reflection layer and the blue light reflection layer and displays a full color image. In this half mirror, the display of a full color image can be ensured by widening the selective reflection band (half-width) of both the reflection layers.

Alternatively, the half mirror according to the embodiment of the present invention may be a half mirror which has, as reflection layers, a red light reflection layer in which the visible light reflection region selectively reflects red light, a green light reflection layer in which the visible light reflection region selectively reflects green light, and a blue light reflection layer in which the visible light reflection region selectively reflects blue light, and corresponds to a HUD which has a laminate of the red light reflection layer, the green light reflection layer, and the blue light reflection layer and displays a full color image.

In a case where the half mirror is formed by laminating a plurality of reflection layers as above, the reflection portions which selectively reflect visible light in the mixed regions of the reflection layers are preferably located at the same positions in the plane direction of the windshield. In other words, in a case where the half mirror is formed by laminating a plurality of reflection layers, the reflection portions are preferably formed so as to overlap one another in the mixed regions of the reflection layers in a case where the windshield is viewed from an observation direction of the HUD.

Due to the above configuration, it is possible to suppress flickering of a useless color in the mixed region.

For example, the half mirror can be produced as follows: reflection layers of respective colors are formed through the above-described ultraviolet irradiation using masks having the same mask pattern, and are laminated with reflection portions aligned in mixed regions therein.

In the above example, the visible light reflection region selectively reflects only one of red light, green light, or blue light in a single reflection layer, but the present invention is not limited thereto. That is, in the half mirror according to the embodiment of the present invention, the visible light reflection region of one reflection layer may selectively reflect red light, green light, and blue light.

Figure 5:
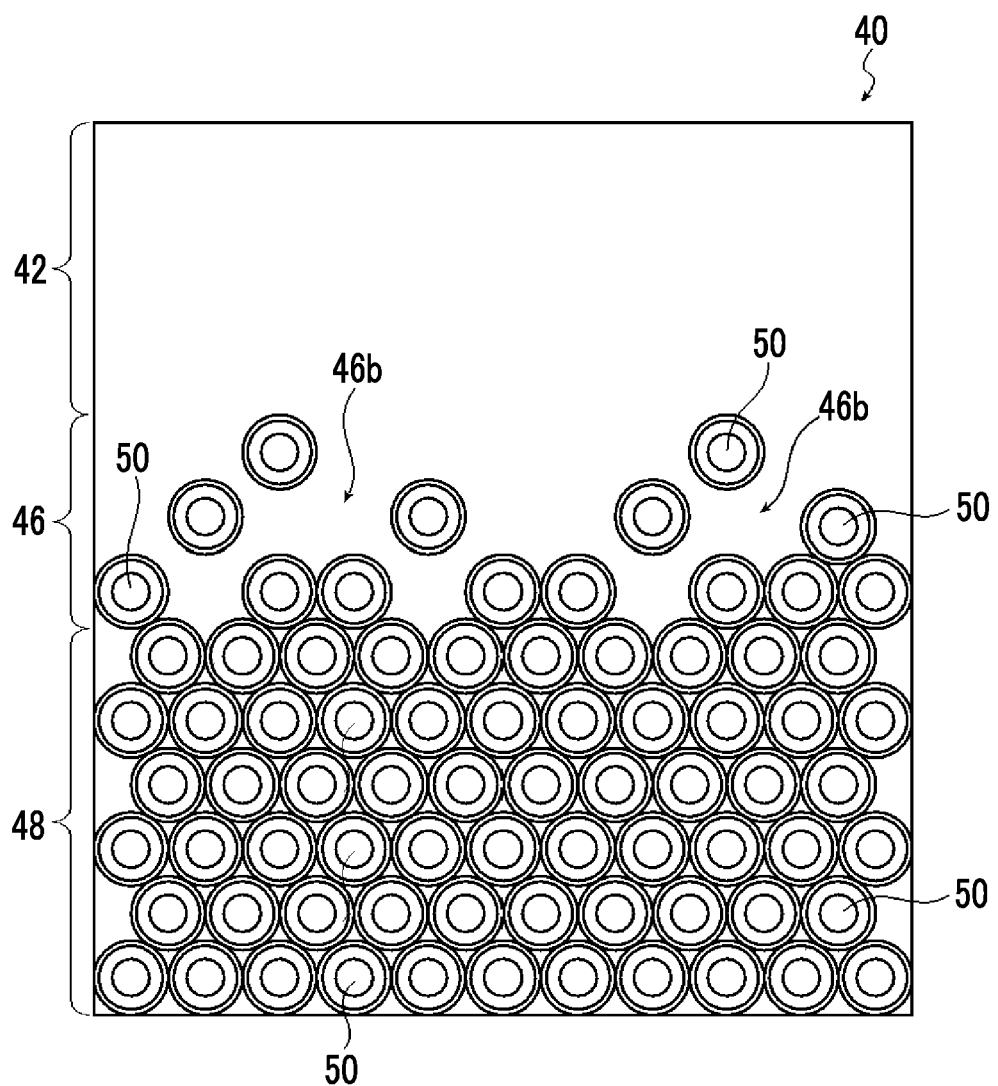
FIG. 5 is a conceptual diagram of still another example of the reflection layer of the half mirror according to the embodiment of the present invention.

FIG. 5 conceptually shows an example thereof.

Similarly to the above-described reflection layer 24, a reflection layer 40 shown in FIG. 5 is also configured to have, from above, an infrared reflection region 42, a mixed region 46, and a visible light reflection region 48.

The infrared reflection region 42 selectively reflects infrared rays over the whole surface, similarly to the infrared reflection region of the reflection layer 24 shown in FIG. 2.

In the reflection layer 40 shown in FIG. 5, the visible light reflection region 48 does not selectively reflect visible light over the whole surface as in the reflection layer 24 shown in FIG. 2, but has a configuration in which circular (dot-like) visible light reflection portions 50 which selectively reflect visible light are arranged most densely and uniformly in two dimensions.

Figure 6:
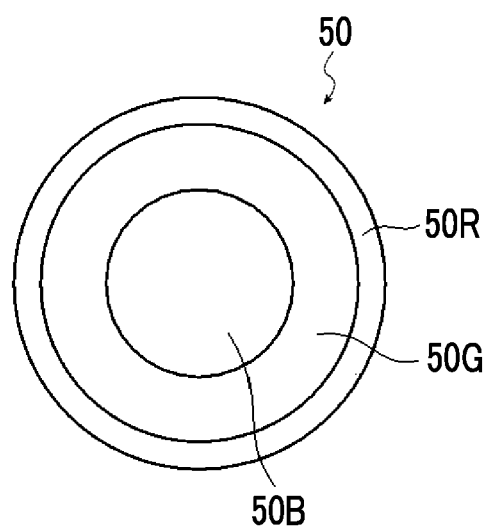
FIG. 6 is a conceptual diagram of an example of reflection portions in the half mirror according to the embodiment of the present invention.

The circular visible light reflection portion 50 is divided into three regions formed by three concentric circles as conceptually shown in FIG. 6. In the visible light reflection portion 50, the outermost concentric zone region formed between the largest circle and the second largest circle is a red light reflection portion 50R formed of a cholesteric liquid crystal layer which selectively reflects red light. In the visible light reflection portion 50, the intermediate concentric zone region formed between the second largest circle and the smallest circle is a green light reflection portion 50G formed of a cholesteric liquid crystal layer which selectively reflects green light. The innermost circular region formed of the smallest circle is a blue light reflection portion 50B formed of a cholesteric liquid crystal layer which selectively reflects blue light.

In the visible light reflection region 48, a gap between the circular visible light reflection portions 50 selectively reflects infrared rays.

In the reflection layer 40, the mixed region 46 also has a configuration in which similar visible light reflection portions 50 are arranged. Here, in the mixed region 46, as conceptually shown in FIG. 5, the number, that is, the area of the visible light reflection portions 50 in a width direction is gradually increased from the visible light reflection region 48 toward the infrared reflection region 42, that is, from the upper side to the lower side of the windshield. Also in the mixed region 46, a part other than the visible light reflection portions 50 is an infrared reflection portion 46b which selectively reflects infrared rays.

Accordingly, according to the reflection layer 40, red light, green light, and blue light can be reflected by a single reflection layer, and a full color image of red, green, and blue can be displayed by a HUD.

The reflection layer 40 can be produced by a method similar to that for the above-described reflection layer 24.

First, as in a case of the above-described reflection layer 24, a liquid crystal composition which forms a cholesteric liquid crystal layer which selectively reflects blue light is applied to a forming surface of the reflection layer 40, for example, a surface of the λ/2 plate 26.

Next, the liquid crystal composition is irradiated with ultraviolet rays using a mask having a mask pattern in which a circular pattern formed by, for example, a black ink is formed at a part corresponding to the visible light reflection portion 50 and ultraviolet rays pass through other regions.

Here, the circular pattern has three regions formed by three concentric circles as in a case of the visible light reflection portion 50, and a mask pattern in which the outermost concentric zone region transmits a large amount of ultraviolet rays, the smallest circular region shields ultraviolet rays, and the amount of ultraviolet rays transmitted in the intermediate concentric zone region is between the amount of ultraviolet rays transmitted in the outermost concentric zone region and the amount of ultraviolet rays transmitted in the smallest circular region is provided.

As described above, the liquid crystal composition forms a cholesteric liquid crystal layer in which the selective reflection wavelength range is increased according to the ultraviolet irradiation dose.

Accordingly, by ultraviolet irradiation via a mask having the above mask pattern corresponding to the visible light reflection portions 50, it is possible to form a visible light reflection portions 50 having a red light reflection portion 50R formed of a cholesteric liquid crystal layer which selectively reflects red light, a green light reflection portion 50G formed of a cholesteric liquid crystal layer which selectively reflects green light, and a blue light reflection portion 50B formed of a cholesteric liquid crystal layer which selectively reflects blue light.

Since ultraviolet rays pass through a part between the visible light reflection portions 50 and a region in which no visible light reflection portion 50 is formed, the part and the region form a cholesteric liquid crystal layer which selectively reflects infrared rays.

Thereafter, as in a case of the above-described reflection layer 24, the liquid crystal composition is aligned into a cholesteric liquid crystalline phase by a heating treatment, and optionally irradiated with ultraviolet rays so as to be cured.

Accordingly, it is possible to form a reflection layer 40 having a visible light reflection region 48 in which visible light reflection portions 50 which selectively reflect visible light are uniformly arranged, a mixed region 46 in which the number of visible light reflection portions 50 which selectively reflect visible light, that is, the area of a part which selectively reflects visible light is gradually decreased toward the upper side, and an infrared reflection region 42 which selectively reflects infrared rays.

The visible light reflection portions 50 shown in FIGS. 5 and 6 have a red light reflection portion 50R, a green light reflection portion 50G, and a blue light reflection portion 50B which are divided by concentric circles, but the present invention is not limited thereto. For example, as in a reflection portion 54 shown in FIG. 7, a configuration in which a red light reflection portion 54R which selectively reflects red light, a green light reflection portion 54G which selectively reflects green light, and a blue light reflection portion 54B which selectively reflects blue light are formed by dividing the circular reflection portion 54 into strips by straight lines can also be used.

Figure 7:
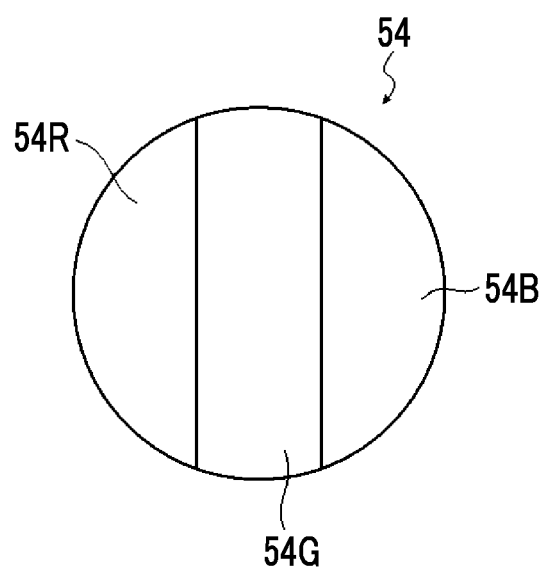
FIG. 7 is a conceptual diagram of another example of the reflection portions in the half mirror according to the embodiment of the present invention.

Although the reflection portions shown in FIGS. 6 and 7 are circular, reflection portions having a polygonal shape such as a square, a rectangle, or a hexagon can also be used. According to such reflection portions, gaps between the reflection portions are eliminated by two dimensional arrangement of the reflection portions, and thus it is possible to form a visible light reflection region which selectively reflects visible light over the whole surface. This also applies to the visible light reflection portions 32*a* and the like.

In the examples shown in FIGS. 5 to 7, the reflection portions forming the visible light reflection region and the mixed region selectively reflect three colors of red light, green light, and blue light, but the present invention is not limited thereto.

That is, in the half mirror according to the embodiment of the present invention having a configuration in which reflection portions having a circular shape or the like which selectively reflect visible light are arranged, the reflection portions forming the visible light reflection region and the mixed region may selectively reflect two colors of red light and green light or two colors of red light and blue light.

In the above examples, the half mirror according to the embodiment of the present invention has the visible light reflection region 34 and the mixed region 32 corresponding to the whole region in the width direction on the lower side of the windshield, but is not limited thereto.

Figure 8:
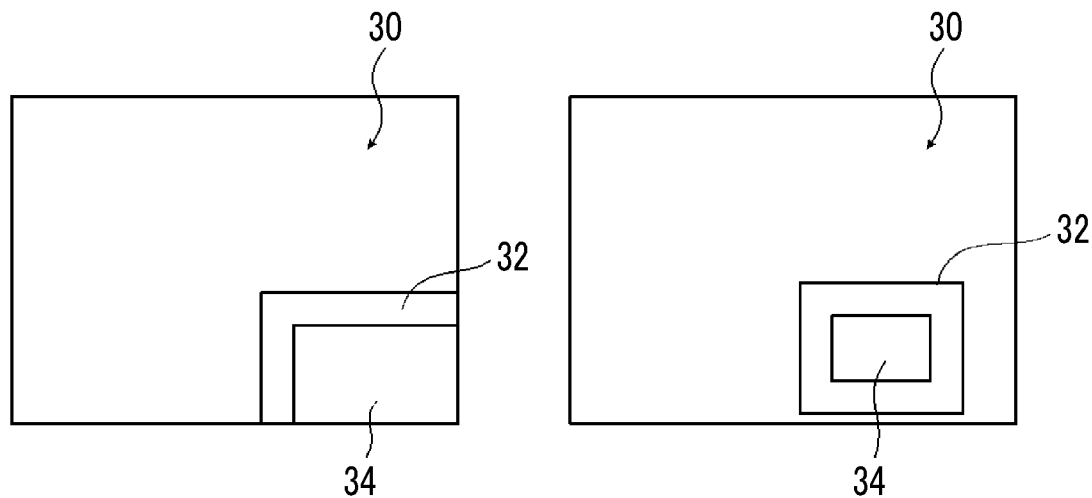
FIG. 8 shows conceptual diagrams of other examples of the half mirror according to the embodiment of the present invention.

For example, as conceptually shown on the left side of FIG. 8, the visible light reflection region 34 may be partially formed at a lower end portion in the width direction of the windshield, and the mixed region 32 may be provided between the visible light reflection region 34 and the infrared reflection region 30. Alternatively, as conceptually shown on the right side of FIG. 8, the visible light reflection region 34 may be formed so as to be included in the surface direction in the infrared reflection region 30, and the mixed region 32 may be provided so as to surround the visible light reflection region 34.

Although the half mirror according to the embodiment of the present invention has been described in detail, the present invention is not limited to the above-described examples, and it is needless to say that various improvements and modifications may be made without departing from the gist of the present invention.

EXAMPLES

Hereinafter, the present invention will be described in more detail with specific examples of the present invention, but is not limited to the following examples.

Example 1

(Preparation of Liquid Crystal Composition 1)
The following components were mixed, and a liquid crystal composition 1 was prepared.

| | |
|---|---|
| Liquid Crystal Compound 1 (structure below): | 100 parts by mass |
| Chiral Agent 1 (structure below): | 9.8 parts by mass |
| Horizontal Alignment Agent 1 (structure below): | 0.02 parts by mass |
| Horizontal Alignment Agent 2 (structure below): | 0.05 parts by mass |
| Photo-Radical Initiator 1 (structure below): | 4 parts by mass |
| Polymerization Inhibitor 1 (structure below): | 1 part by mass |
| Methyl Ethyl Ketone (MEK): | 160 parts by mass |

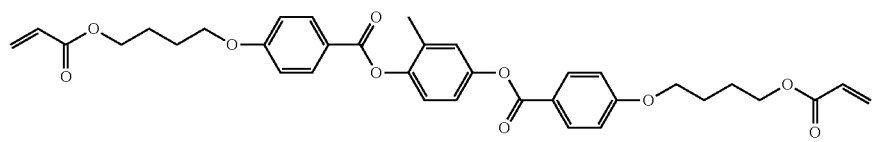

Liquid Crystal Compound 1

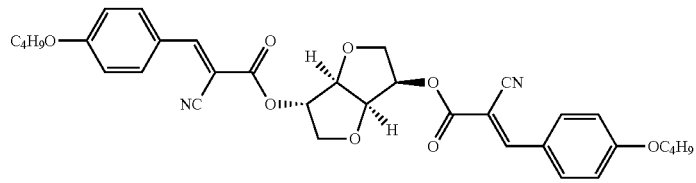

Client Agent 1

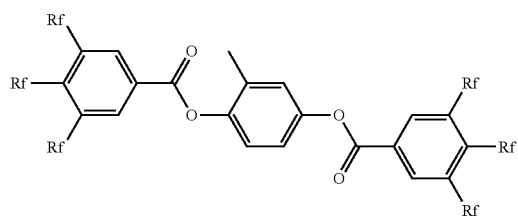

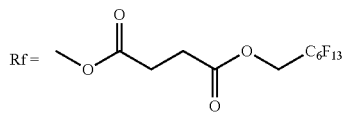

Horizontal Alignment Agent 1

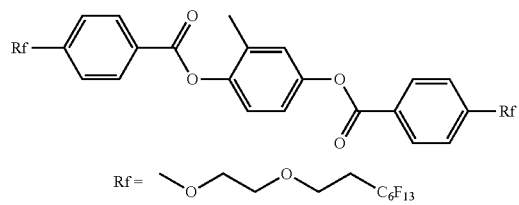

Rf = 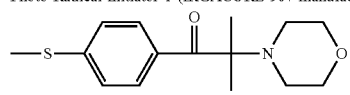

Horizontal Alignment Agent 2

Photo-Radical Initiator 1 (IRGACURE 907 manufactured by BASF SE)

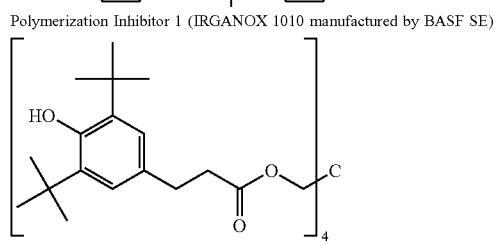

Polymerization Inhibitor 1 (IRGANOX 1010 manufactured by BASF SE)

(Coating Liquid for Forming λ/2 Plate)

The following components were mixed, and a coating liquid for forming a λ/2 plate having the following composition was prepared.

| | |
|---|---|
| Liquid Crystal Compound 1 | 80 parts by mass |
| Liquid Crystal Compound 2 (structure below) | 20 parts by mass |
| Horizontal Alignment Agent 2 | 0.1 parts by mass |
| Horizontal Alignment Agent 1 | 0.007 parts by mass |
| Polymerization Initiator (IRGACURE OXE01 manufactured by BASF SE) | 1.0 parts by mass |
| Solvent (methyl ethyl ketone) the amount thereof is set such that a solute concentration is 30 mass %. | |

Liquid Crystal Compound 2

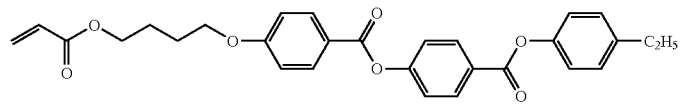 [SMILES: C=CC(=O)OCCCCOc1ccc(C(=O)Oc2ccc(C(=O)Oc3ccc(CC)cc3)cc2)cc1]

<Production of Half Mirror>

(Formation of λ/2 Plate (Retardation Layer))

A PET film (COSMOSHINE A4100 manufactured by TOYOBO CO., LTD.) of 1,200 mm vertical×1,400 mm horizontal with a thickness of 100 μm was prepared as a temporary support.

One side of the temporary support was rubbed with rayon cloth (pressure: 0.1 kgf (0.98 N), rotation speed: 1,000 rpm, transport speed: 10 m/min, number of times: one reciprocation) counterclockwise in a direction of 60° with the vertical direction (0°) as a reference.

The rubbed surface of the temporary support was coated with a prepared coating liquid for forming a λ/2 plate using a wire bar.

After drying of the coating liquid for forming a λ/2 plate, the temporary support was put on a hot plate at 30° C. and irradiated with ultraviolet rays for 6 seconds by an electrodeless lamp (D-BULB manufactured by HERAEUS) with an output of 60 mW/cm² to fix the liquid crystalline phase, and thus a λ/2 plate (retardation layer) having a thickness of 2 μm was formed.

(Formation of Green Light Reflection Layer)

A surface of the λ/2 plate formed as above was coated with the prepared liquid crystal composition 1 using a wire bar.

Next, ultraviolet irradiation was performed thereon for a certain period of time at room temperature under an oxygen atmosphere via a mask having a mask pattern provided by black light shielding portions (black mask) corresponding to an infrared reflection region, a mixed region, and a visible light reflection region.

Figure 9:
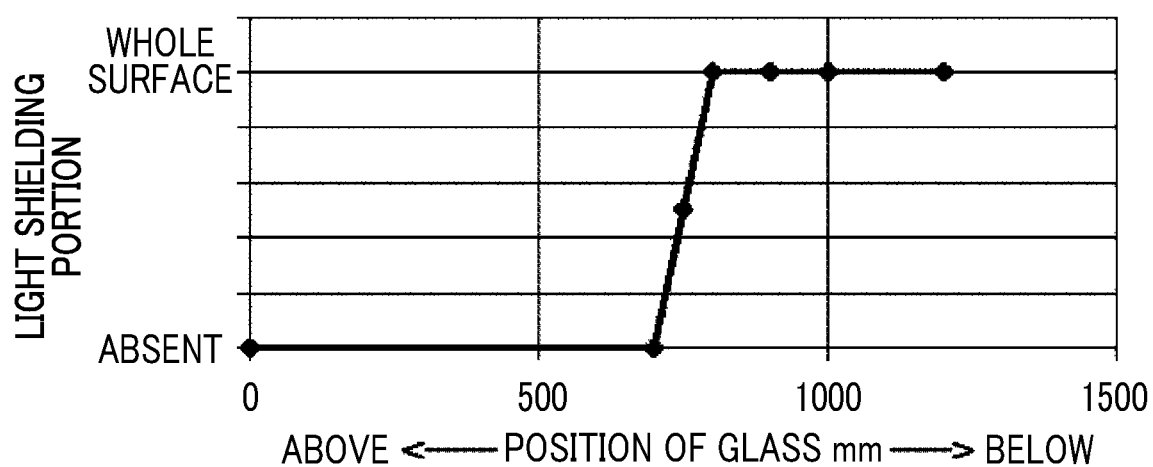
FIG. 9 is a graph for explaining an example of the present invention.

As the mask, a mask of 1,200 mm vertical×1,400 mm horizontal with a mask pattern in which as shown in the image of FIG. 9, a region from the top of the windshield to 700 mm below had no light shielding portion, a 100 mm-region 700 to 800 mm below the top had circular light shielding portions having a diameter of 2 mm such that the number of the light shielding portions in a width direction was gradually increased from above toward below from the state in which no light shielding portion existed, and the whole surface in the width direction was constituted by the light shielding portions, and from the position 800 mm below the top to the lowermost portion (1,200 mm below the top), the whole surface was constituted by the light shielding portions was used (see FIG. 2).

A UV transilluminator LM-26 type manufactured by Funakoshi Co., Ltd. was used as a light source for ultraviolet irradiation. The center wavelength of ultraviolet rays emitted from the light source is 365 nm.

In addition, the ultraviolet irradiation time (certain period of time described above) was set to such a period of time that the ultraviolet irradiation dose in the region having no light shielding portion was 40 mJ/cm$^2$. The black density of the light shielding portion was adjusted to such a density that the amount of ultraviolet rays applied via the light shielding portion for the certain period of time was 4 mJ/cm$^2$.

Next, the temporary support on which the liquid crystal composition 1 irradiated with ultraviolet rays had been formed was left to stand for 1 minute on a hot plate at 100° C., whereby the coating film was heat-treated and the liquid crystal composition 1 was brought into a state of a cholesteric liquid crystalline phase.

Thereafter, the heat-treated coating film was irradiated with ultraviolet rays for a certain period of time at room temperature under a nitrogen atmosphere (with an oxygen concentration of 500 ppm or less) so as to be cured, and thus a reflection layer formed of a cholesteric liquid crystal layer having a thickness of 2 μm was formed.

EXECURE 3000-W manufactured by HOYA CANDEO OPTRONICS CORPORATION was used as an ultraviolet light source. The light source is a high-pressure mercury lamp and has an emission line in the ultraviolet light range.

In the produced reflection layer, a region from the top of the windshield to 700 mm below was a cholesteric liquid crystal layer (infrared reflection region) having a selective reflection center wavelength of 750 nm over the whole surface, a region 700 to 800 mm below the top was a region (mixed region) in which a cholesteric liquid crystal layer having a selective reflection center wavelength of 750 nm and circular cholesteric liquid crystal layers having a selective reflection center wavelength of 530 nm and a diameter of 2 mm were mixed, and the area of the circular cholesteric liquid crystal layers having a selective reflection center wavelength of 530 nm was gradually increased toward the lower side, and a region from 800 mm below the top to the lowermost portion (1,200 mm below the top) was a cholesteric liquid crystal layer (visible light reflection region) having a selective reflection center wavelength of 530 nm over the whole surface.

That is, the reflection layer is a green light reflection layer in which the visible light reflection region selectively reflects green light.

In this example, the region (mixed region) in which the area of the circular cholesteric liquid crystal layers is gradually increased specifically refers to a region in which the number of the circular cholesteric liquid crystal layers in the width direction, that is, the total area of the circular cholesteric liquid crystal layers in the width direction is gradually increased toward the lower side corresponding to the circular light shielding portions of the mask. This also applies to the following examples.

(Formation of Red Light Reflection Layer)

The produced green light reflection layer was coated with the liquid crystal composition 1 in the same manner as in the case of the green light reflection layer.

Next, ultraviolet irradiation was performed thereon in the same manner as in the case of the green light reflection layer via a mask having the same mask pattern as that for the green light reflection layer. The black density of the light shielding portion was adjusted to such a density that the ultraviolet irradiation dose was 15 mJ/cm$^2$ by the ultraviolet irradiation for such a certain period of time that the ultraviolet irradiation dose in the region having no light shielding portion was 40 mJ/cm$^2$.

Thereafter, a reflection layer formed of a cholesteric liquid crystal layer having a thickness of 3 μm was formed in the same manner as in the case of the green light reflection layer.

In the produced reflection layer, a region from the top of the windshield to 700 mm below was a cholesteric liquid crystal layer (infrared reflection region) having a selective reflection center wavelength of 750 nm over the whole surface, a region 700 to 800 mm below the top was a region (mixed region) in which a cholesteric liquid crystal layer having a selective reflection center wavelength of 750 nm and circular cholesteric liquid crystal layers having a selective reflection center wavelength of 650 nm and a diameter of 2 mm were mixed, and the area (the number in the width direction) of the circular cholesteric liquid crystal layers having a selective reflection center wavelength of 650 nm was gradually increased toward the lower side, and a region from 800 mm below the top to the lowermost portion (1,200 mm below the top) was a cholesteric liquid crystal layer (visible light reflection region) having a selective reflection center wavelength of 650 nm.

That is, the reflection layer is a red light reflection layer in which the visible light reflection region selectively reflects red light.

In this manner, a half mirror was produced in which two reflection layers, that is, the green light reflection layer and the red light reflection layer were provided on the λ/2 plate.

(Production of Windshield)

An OCA tape (MHM-UVC15 manufactured by NICHIEI KAKOH CO., LTD.) was adhered as an intermediate film to a glass plate of 1,200 mm vertical×1,400 mm horizontal with a thickness of 2 mm. "OCA" is an abbreviation for "Optical Clear Adhesive".

Next, the produced half mirror was adhered to the intermediate film using a roller such that the reflection layer was on the glass surface side. Next, the temporary support adhered to the λ/2 plate was peeled off. Thereafter, a polyvinyl butyral film (manufactured by Sekisui Chemical Co., Ltd.) having a thickness of 0.38 mm and cut into a size of 1,200 mm vertical×1,400 mm horizontal was adhered as an intermediate film to the λ/2 plate. Furthermore, a glass plate of 1,200 mm vertical×1,400 mm horizontal with a thickness of 2 mm was adhered on the polyvinyl butyral film to produce a laminate.

In the production of the laminate, the rubbing direction of the λ/2 plate of the half mirror was set to be a direction of 60° counterclockwise with the short side direction of the glass plate as a reference in a case where the direction was viewed from the glass plate side on which the OCA tape was adhered, and the half mirror was adhered such that a region from the top of the windshield to 700 mm below was an infrared reflection region, a region from the lowermost portion of the windshield to 400 mm above was a visible light reflection region, and a range 700 to 800 mm below the top was a mixed region.

The laminate was held for 1 hour at 90° C. and 0.1 atm, and then heated for 20 minutes at 115° C. and 13 atm in an autoclave (manufactured by Kurihara) to remove bubbles, and thus a windshield was produced.

Example 2

The same green light reflection layer as that of Example 1 was formed on the same temporary support as that of Example 1 to produce a half mirror.

A windshield was produced in the same manner as in Example 1, except that the above half mirror was used.

Example 3

A λ/2 plate was formed in the same manner as in Example 1 on the same temporary support as that of Example 1.

The λ/2 plate was coated with the liquid crystal composition 1 in the same manner as in the case of the green light reflection layer of Example 1.

Next, ultraviolet irradiation was performed thereon in the same manner as in the case of the green light reflection layer of Example 1 via a mask having exactly the same mask pattern as in Example 1. The black density of the light shielding portion was adjusted to such a density that the ultraviolet irradiation dose was 0 mJ/cm$^2$ by the ultraviolet irradiation for such a certain period of time that the ultraviolet irradiation dose in the region having no light shielding portion was 40 mJ/cm$^2$.

Thereafter, a reflection layer formed of a cholesteric liquid crystal layer having a thickness of 2 µm was formed in the same manner as in the case of the green light reflection layer of Example 1.

In the produced reflection layer, a region from the top of the windshield to 700 mm below was a cholesteric liquid crystal layer (infrared reflection region) having a selective reflection center wavelength of 750 nm over the whole surface, a region 700 to 800 mm below the top was a region (mixed region) in which a cholesteric liquid crystal layer having a selective reflection center wavelength of 750 nm and circular cholesteric liquid crystal layers having a selective reflection center wavelength of 450 nm and a diameter of 2 mm were mixed, and the area (the number in the width direction) of the circular cholesteric liquid crystal layers having a selective reflection center wavelength of 450 nm was gradually increased toward the lower side, and a region from 800 mm below the top to the lowermost portion (1,200 mm below the top) was a cholesteric liquid crystal layer (visible light reflection region) having a selective reflection center wavelength of 450 nm over the whole surface.

That is, the reflection layer is a blue light reflection layer in which the visible light reflection region selectively reflects blue light.

On the produced blue light reflection layer, a red light reflection layer was formed in the same manner as in the case of the red light reflection layer of Example 1.

In this manner, a half mirror was produced in which two reflection layers, that is, the blue light reflection layer and the red light reflection layer were provided on the λ/2 plate.

A windshield was produced in the same manner as in Example 1, except that the above half mirror was used.

Example 4

A mask of 1,200 mm vertical×1,400 mm horizontal having a mask pattern in which a region from the top of the windshield to 700 mm below had no light shielding portion, and circular black light shielding portions having a diameter of 173 µm were arranged in a region from 700 mm below the top to therebelow was prepared.

The circular light shielding portion is composed of three concentric circles, a circle having a diameter of 173 µm, a circle having a diameter of 141 µm, and a circle having a diameter of 100 µm (see FIG. 6). That is, the circular light shielding portion has three regions, an outermost concentric zone region between the circle having a diameter of 173 µm and the circle having a diameter of 141 µm, an intermediate concentric zone region between the circle having a diameter of 141 µm and the circle having a diameter of 100 µm, and the innermost circular region having a diameter of 100 µm, and the respective regions have different black densities.

Specifically, the black density of the light shielding portion was adjusted to such a density that the amount of ultraviolet rays transmitted through the outermost concentric band region was 15 mJ/cm$^2$, the amount of ultraviolet rays transmitted through the intermediate concentric band region was 4 mJ/cm$^2$, and the amount of ultraviolet rays transmitted through the innermost circular region was 0 mJ/cm$^2$ by the ultraviolet irradiation for such a certain period of time that the ultraviolet irradiation dose in the region having no light shielding portion was 40 mJ/cm$^2$.

Figure 10:
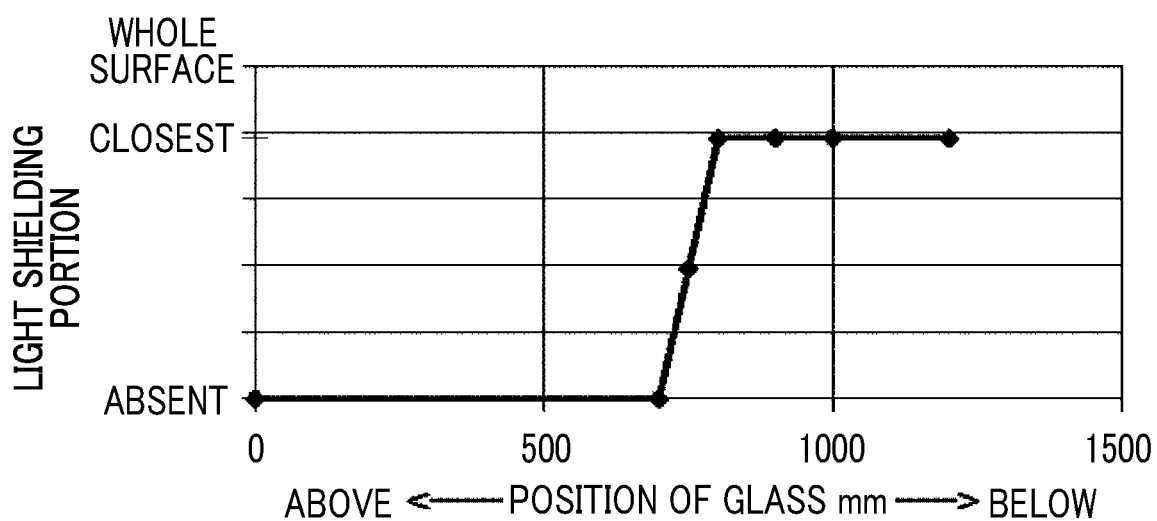
FIG. 10 is a graph for explaining an example of the present invention.

As shown in the image of FIG. 10, in the mask pattern of the above mask, a region from the top of the windshield to 700 mm below had no light shielding portion, a 100 mm-region 700 to 800 mm below the top had circular light shielding portions such that the area (the number in the width direction) of the light shielding portions was gradually increased from above toward below from the state in which no light shielding portion existed to the closest packing, and circular light shielding portions were arranged in a closest packed manner from 800 mm below the top to the lowermost portion (1,200 mm below the top) (see FIG. 5). The area ratio of the light shielding portions in the region in which the circular light shielding portions were closest packed was 78.5%.

A λ/2 plate was formed in the same manner as in Example 1 on the same temporary support as that of Example 1.

The λ/2 plate was coated with the liquid crystal composition 1 in the same manner as in the case of the green light reflection layer of Example 1.

Next, ultraviolet irradiation was performed thereon in the same manner as in Example 1 via a previously prepared mask for such a certain period of time that the ultraviolet irradiation dose in the region having no light shielding portion was 40 mJ/cm$^2$.

Thereafter, a reflection layer was formed in the same manner as in the case of the green light reflection layer of Example 1.

In the produced reflection layer, a region from the top of the windshield to 700 mm below was a cholesteric liquid crystal layer (infrared reflection region) having a selective reflection center wavelength of 750 nm over the whole surface, a region 700 to 800 mm below the top was a region (mixed region) in which a cholesteric liquid crystal layer having a selective reflection center wavelength of 750 nm and circular cholesteric liquid crystal layers having three concentric circles were mixed, and the area ratio (the number in the width direction) of the circular cholesteric liquid crystal layers was gradually increased toward the lower side, and a region from 800 mm below the top to the lowermost portion (1,200 mm below the top) was a region in which circular cholesteric liquid crystal layers having three concentric circles were closest packed. The area ratio of the circular cholesteric liquid crystal layers in the region in which the circular cholesteric liquid crystal layers were closest packed was 78.5%.

In the circular cholesteric liquid crystal layer having three concentric circles, the outermost concentric zone region was a cholesteric liquid crystal layer (red light reflection portion) having a selective reflection center wavelength of 650 nm, the intermediate concentric zone region was a cholesteric liquid crystal layer (green light reflection portion) having a selective reflection center wavelength of 530 nm, and the inner circular region was a cholesteric liquid crystal layer (blue light reflection portion) having a selective reflection center wavelength of 450 nm.

In this manner, a half mirror having, on a λ/2 plate, a reflection layer in which circular reflection portions, each having a red light reflection portion, a green light reflection portion, and a blue light reflection portion having a concentric shape, were arranged was produced.

A windshield was produced in the same manner as in Example 1, except that the above half mirror was used.

Comparative Example 1

A half mirror was formed in the same manner as in Example 1, except that in the formation of a green light reflection layer and a red light reflection layer, a mask having a mask pattern in which a region corresponding to a mixed region in which light shielding portions having a diameter of 2 mm were gradually increased from the upper side to the lower side was eliminated, a region from the top of the windshield to 700 mm below allowed ultraviolet rays to pass through over the whole surface, and a region from 700 mm below the top to the lowermost portion was a light shielding portion over the whole surface was used.

A windshield was produced in the same manner as in Example 1, except that the above half mirror was used.

[Evaluation]

Regarding the produced windshields, a feeling of glare and visibility of a boundary were evaluated.

<Feeling of Glare>

In a state in which the produced windshield was placed in the open air and tilted 60° from the vertical direction, sensory evaluation of a feeling of glare in a region from an upper portion of the windshield (0 mm) to 500 mm below in a case where the windshield was viewed from a position 800 mm away therefrom was performed.

A case where the feeling of glare was low was determined to be OK, and a case where the feeling of glare was high was determined to be NG.

<Boundary Visibility>

The windshield was viewed from a position 800 mm away therefrom to observe a boundary between the lower region reflecting visible light and the upper region reflecting no visible light. A case where the boundary was inconspicuous was determined to be OK, and a case where the boundary was conspicuous was determined to be NG.

The results are shown in the following table.

TABLE 1

| | | | Example 1 | Example 2 | Example 3 | Example 4 | Comparative Example 1 |
|---|---|---|---|---|---|---|---|
| Reflection Layer | Red Light Reflection Layer | Infrared Reflection Region | From Upper Portion to 700 mm Below | Absence | From Upper Portion to 700 mm Below | Absence | From Upper Portion to 700 mm Below |
| | | Mixed Region | 700 to 800 mm Below | | 700 to 800 mm Below | | Absence |
| | | Visible Light Reflection Region | From 800 mm Below to Lower Portion | | From 800 mm Below to Lower Portion | | From 700 mm Below to Lower Portion |
| | Green Light Reflection Layer | Infrared Reflection Region | From Upper Portion to 700 mm Below | From Upper Portion to 700 mm Below | Absence | Absence | From Upper Portion to 700 mm Below |
| | | Mixed Region | 700 to 800 mm Below | 700 to 800 mm Below | | | Absence |
| | | Visible Light Reflection Region | From 800 mm Below to Lower Portion | From 800 mm Below to Lower Portion | | | From 700 mm Below to Lower Portion |
| | Blue Light Reflection Layer | Infrared Reflection Region | Absence | Absence | From Upper Portion to 700 mm Below | Absence | Absence |
| | | Mixed Region | | | 700 to 800 mm Below | | |
| | | Visible Light Reflection Region | | | From 800 mm Below to Lower Portion | | |
| | RGB Reflection Layer (Concentric Shape) | Infrared Reflection Region | Absence | Absence | Absence | From Upper Portion to 700 mm Below | Absence |
| | | Mixed Region | | | | 700 to 800 mm Below | |
| | | Visible Light Reflection Region | | | | From 800 mm Below to Lower Portion | |
| | λ/4 Plate | | Presence | Absence | Presence | Presence | Presence |
| | Feeling of Glare | | OK | OK | OK | OK | NG |
| | Boundary Visibility | | OK | OK | OK | OK | NG |

As shown in the above table, according to the half mirror according to the embodiment of the present invention, a feeling of glare is suppressed, and a boundary between the visible light reflection region and the non-reflection region which does not reflect visible light can be made inconspicuous in the windshield used in a HUD.

From the above results, the effects of the present invention are remarkable.

The present invention is suitably applicable as a screen of a HUD.

EXPLANATION OF REFERENCES

10: windshield
12: outer surface side glass
14: inner surface side glass
16: intermediate film
20: half mirror
24: reflection layer
26: λ/2 plate
30, 42: infrared reflection region
32, 46: mixed region
32a, 50, 54: visible light reflection portion
32b, 46b: infrared reflection portion
34, 48: visible light reflection region
50R, 54R: red light reflection portion
50G, 54G: green light reflection portion
50B, 54B: blue light reflection portion

What is claimed is:

1. A half mirror which is used for a windshield, comprising:
a reflection layer including a non-reflection region which does not reflect visible light, a reflection region which is formed of a cholesteric liquid crystal layer and selectively reflects visible light, and a mixed region between the non-reflection region and the reflection region, in which a non-reflection portion which does not reflect visible light and a reflection portion which is formed of a cholesteric liquid crystal layer and selectively reflects visible light are mixed,
wherein in the mixed region, an area of the reflection portion is gradually increased from the non-reflection region toward the reflection region.

2. The half mirror according to claim 1,
wherein the non-reflection region of the reflection layer is formed of a cholesteric liquid crystal layer and reflects ultraviolet rays or infrared rays.

3. The half mirror according to claim 2,
wherein the reflection layer has no joining surface between the non-reflection region and the mixed region and between the mixed region and the reflection region.

4. The half mirror according to claim 1,
wherein the reflection layer has no joining surface between the non-reflection region and the mixed region and between the mixed region and the reflection region.

5. The half mirror according to claim 1,
wherein the reflection layer has at least one of a red light reflection layer in which the reflection region selectively reflects red light, a green light reflection layer in which the reflection region selectively reflects green light, or a blue light reflection layer in which the reflection region selectively reflects blue light.

6. The half mirror according to claim 5,
wherein two of the red light reflection layer, the green light reflection layer, and the blue light reflection layer are provided.

7. The half mirror according to claim 1,
wherein the reflection region of the reflection layer selectively reflects at least two of red light, green light, and blue light.

8. The half mirror according to claim 1, further comprising:
a λ/2 plate.

9. The half mirror according to claim 1,
wherein the reflection region and the reflection portion of the mixed region are constituted by a plurality of circular visible light reflection portions, and each of the plurality of circular visible light reflection portions is divided into a plurality of regions having different selective reflection wavelength ranges.

10. A half mirror which is used for a windshield, comprising:
a reflection layer including a non-reflection region which does not reflect visible light, a reflection region which is formed of a cholesteric liquid crystal layer and selectively reflects visible light, and a mixed region between the non-reflection region and the reflection region, in which a non-reflection portion which does not reflect visible light and a reflection portion which is formed of a cholesteric liquid crystal layer and selectively reflects visible light are mixed,
wherein when viewed in a normal direction of a light incident surface of the reflection layer on which visible light is incident, an area of the reflection portion in the mixed region is gradually increased from the non-reflection region toward the reflection region, so that a reflectivity of the reflection layer is gradually increased from the non-reflection region toward the reflection region.

11. The half mirror according to claim 10,
wherein the non-reflection region of the reflection layer is formed of a cholesteric liquid crystal layer and reflects ultraviolet rays or infrared rays.

12. The half mirror according to claim 11,
wherein the reflection layer has no joining surface between the non-reflection region and the mixed region and between the mixed region and the reflection region.

13. The half mirror according to claim 10,
wherein the reflection layer has no joining surface between the non-reflection region and the mixed region and between the mixed region and the reflection region.

14. The half mirror according to claim 10,
wherein the reflection layer has at least one of a red light reflection layer in which the reflection region selectively reflects red light, a green light reflection layer in which the reflection region selectively reflects green light, or a blue light reflection layer in which the reflection region selectively reflects blue light.

15. The half mirror according to claim 14,
wherein two of the red light reflection layer, the green light reflection layer, and the blue light reflection layer are provided.

16. The half mirror according to claim 10,
wherein the reflection region of the reflection layer selectively reflects at least two of red light, green light, and blue light.

17. The half mirror according to claim 10, further comprising:
a λ/2 plate.

18. The half mirror according to claim 10,
wherein the reflection region and the reflection portion of the mixed region are constituted by a plurality of circular visible light reflection portions, and each of the plurality of circular visible light reflection portions is divided into a plurality of regions having different selective reflection wavelength ranges.

\* \* \* \* \*